US006244782B1

(12) United States Patent
Bitelli

(10) Patent No.: US 6,244,782 B1
(45) Date of Patent: Jun. 12, 2001

(54) FINISHING MACHINE WITH A WEIGHING DEVICE FOR THE ASPHALT

(75) Inventor: Romolo Bitelli, S. Lazzaro (IT)

(73) Assignee: Bitelli SpA, Minerbio (IT)

( * ) Notice: Subject to any disclaimer, the term of this patent is extended or adjusted under 35 U.S.C. 154(b) by 0 days.

(21) Appl. No.: 09/271,380

(22) Filed: Mar. 18, 1999

(30) Foreign Application Priority Data

Mar. 20, 1998 (IT) .............................. VI98A0057
Aug. 11, 1998 (EP) ................................. 98115033

(51) Int. Cl.$^7$ ................................................ E01C 23/07
(52) U.S. Cl. ..................... 404/84.1; 404/84.05; 404/101; 404/108; 198/841
(58) Field of Search ......................... 404/75, 84.1, 84.05, 404/101, 108, 110, 136, 81, 82, 102, 103, 105, 118; 198/841

(56) References Cited

U.S. PATENT DOCUMENTS

| 3,669,247 | * | 6/1972 | Pulver ................................. 198/189 |
| 3,967,912 | * | 7/1976 | Parker ................................. 404/84 |
| 4,011,023 | * | 3/1977 | Cutler ................................. 404/91 |
| 4,012,160 |   | 3/1977 | Parker . |
| 4,267,777 | * | 5/1981 | Theurer et al. ..................... 104/7 R |
| 4,325,580 | * | 4/1982 | Swisher, Jr. et al. ................ 299/39 |
| 4,332,505 |   | 6/1982 | Mauldin . |
| 4,946,307 | * | 8/1990 | Jakob ................................. 404/91 |
| 4,974,993 | * | 12/1990 | Crabbi ................................ 404/79 |
| 5,000,615 | * | 3/1991 | Murray ............................... 404/75 |
| 5,044,485 | * | 9/1991 | Loder ................................. 198/325 |
| 5,044,819 | * | 9/1991 | Kilheffer et al. .................... 404/72 |
| 5,309,407 | * | 5/1994 | Sehr et al. .......................... 367/96 |
| 5,356,238 | * | 10/1994 | Musil et al. ....................... 404/84.1 |
| 5,447,388 | * | 9/1995 | Rouse ................................. 404/72 |
| 5,452,966 | * | 9/1995 | Swisher, Jr. ......................... 404/72 |
| 5,480,256 | * | 1/1996 | Itesekson et al. .................... 404/72 |
| 5,568,992 | * | 10/1996 | Grembowicz et al. ............. 404/101 |
| 5,590,976 | * | 1/1997 | Kilheffer et al. .................... 404/72 |
| 5,597,062 | * | 1/1997 | Biwer ................................. 198/600 |
| 5,810,153 | * | 9/1998 | Zimmerman et al. .............. 198/495 |
| 5,876,150 | * | 3/1999 | Koleszar ............................. 404/84.2 |
| 5,921,706 | * | 7/1999 | Manatt et al. ....................... 404/72 |
| 5,947,636 | * | 9/1999 | Mara ................................. 404/84.02 |
| 5,988,936 | * | 11/1999 | Smith ................................ 404/84.2 |
| 6,109,825 | * | 8/2000 | Yon ................................... 404/84.05 |
| 6,113,310 | * | 9/2000 | Hesse, Jr. .......................... 404/108 |

FOREIGN PATENT DOCUMENTS 0 442 593 A1    8/1991    (EP) .

* cited by examiner

Primary Examiner—Thomas B. Will
Assistant Examiner—Kristine Markovich
(74) Attorney, Agent, or Firm—Dykema Gossett PLLC

(57) ABSTRACT

A finishing machine for the laying of the asphalt surface having a conveyer, and a hopper for the storage and the distribution of material. The conveyer, that moves material from the hopper to the auger, has a couple of chains connected with one another by transversal splines that are suitable for the transport of the material. The material crawls on a plurality of fixed plates secured to the frame of the machine, and the chains run on the plates. The last plate, which supports the passing material, is floating in comparison with the fixed plate which precedes it. The last plate is on a weighing device, and the device is connected with a control power unit. The control power unit detects a signal relevant to the reading of the weight of the material. The signals are detected at time intervals, depending on the angular speed of the hopper, and allows weighings to take place after all the weighed material has been unloaded from the weighing plate.

5 Claims, 3 Drawing Sheets

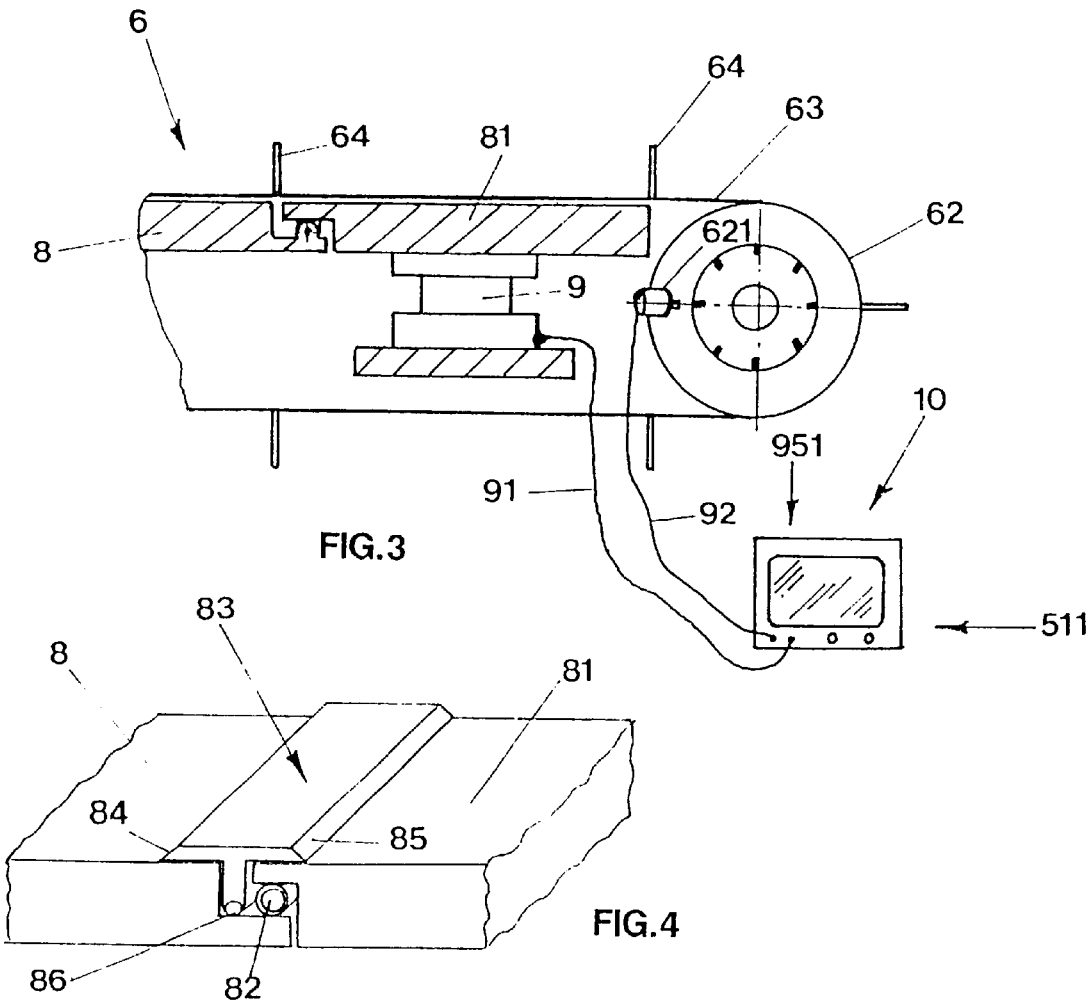

FINISHING MACHINE WITH A WEIGHING DEVICE FOR THE ASPHALT

BACKGROUND OF THE INVENTION

The present patent regards a finishing machine supplied with a weighing device for the asphalt distributed by it.

DESCRIPTION OF THE RELATED ART

As it is known, finishing machines or vibratory finishing machines are machines that lay a layer of new asphalt surface after the carriageway has been prepared and after the old asphalt has been removed by scarifier machines.

Finishing or vibratory finishing machines as known in the art generally have a hopper for the storage and the distribution of the asphalt conglomerate. Such machines also have one or two conveyers, which from the bottom of the hopper, transport the asphalt on the back of the machine. The finishing machine also has one or two augers that distribute the asphalt that is received from the conveyer. A shearing and compacting device with vibratory elements for the compressing of the laid asphalt surface is also part of the finishing machine.

The thickness of the asphalt replaced on the carriageway, and therefore the amount of the asphalt itself, is a function of the speed of the machine and of the capacity of the conveyors to distribute the asphalt to the augers. Since the excellence of the asphalting depends, besides on the quality of the conglomerate which is used, also on the thickness of the laid asphalt, it is very important to know the thickness which is actually deposited by the finishing machine.

The present methods currently known in the art, determine only the thickness of the asphalt by the coring, which is made by sampling of some points at random. With this system, it is possible to obtain only partial information with regard to the executed work. The measure of the thickness of the asphalt is a measure of the destructive kind which means that the coring causes some holes in the road surface. After the coring, the holes should be covered again. Besides the need of giving or receiving a certification of the asphalting work which as been executed, the cost of the asphalting works is also a consideration.

BRIEF SUMMARY OF THE INVENTION

The purpose of the present invention is that of overcoming the limits before mentioned.

One of the purposes of the finishing machine of the invention is for arranging a weighing device in order to determine the weight of the material distributed by the machine during the work.

Another purpose is for determining the weight of the material distributed in a certain area and/or along a certain stretch of road.

Another purpose is for certifying the amount of asphalt distributed from the machine itself along a certain route.

Yet another purpose is fort he machine to give accurate and reliable information, and that such information is independent from the working conditions of the machine itself.

All the stated purposes and other ones as identified later, are achieved by a finishing machine for the laying of asphalt surfaces having: a hopper for the storage and the distribution of the material; at least a conveyer of the material of the hopper; at least one auger for the distribution of the material; and at least a shearing device for the compressing of the asphalt.

The conveyer has a couple of chains moved by pulleys and connected with one another by transversal splines suitable for the transport of the material taken from the bottom of the hopper. The material is leaned on a plurality of fixed plates anchored to the frame of the machine. The couple of chains run on the plates of the machine. The last plate, which supports the passing materials before the transfer on to the distribution auger, is made to swing in comparison with the fixed plate which precedes it, and the last plate leans on a weighing device. The device is connected with a control power unit which detects the reading of the weight, at time intervals which are a function of the angular speed of the pulley of the conveyer.

The control power unit allows two following weighings to take place after all the weighed material has been unloaded from the weighing plate.

Advantageously, according to the invention, the last one of the plates, which supports the passing material from the hopper to the distribution augers, is made to swing by a hinge. The hinge is arranged on an edge of the plate and it is supported by a weighing device, such as the loading cells.

The weighing is executed at time intervals which are a function of the speed of the pulley and of the angle which it runs. Each weighing can take place every time that the pulley has carried away a length of a chain similar to the length of the weighing plate. Accordingly, the certainty of weighing a new material is achieved.

The control power unit records the weight as a function of the speed of the conveyer of the material. The control power unit also receives information relevant to the advancing speed of the machine. As such, it is possible to elaborate the information relevant to the laying of the asphalt according to a certain route of the machine. Also, the machine is supplied with sensors which give the information of the width of the front of laying of the asphalt. It is clear that the information relevant to the weight of the asphalt in following areas and therefore the information relevant to the thickness of laid asphalt can be obtained.

BRIEF DESCRIPTION OF THE SEVERAL VIEWS OF THE DRAWINGS

Further characteristics and peculiarities of the invention will be pointed out during the description of a preferred embodiment of the invention given as an example but not as a restriction and represented in the enclosed drawings wherein:

FIG. 3 is an enlarged side view of the weighing plate; and

FIG. 4 is an enlarged perspective view of the covering gasket in between the weighing plate and the plate which precedes it.

DETAILED DESCRIPTION OF THE INVENTION

Figure 1A:
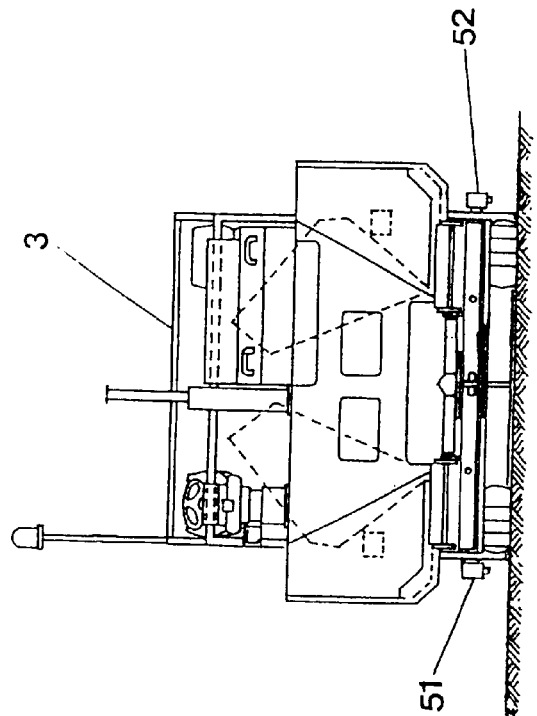
FIG. 1a is a front view of the finishing machine of FIG. 1.
Figure 1:
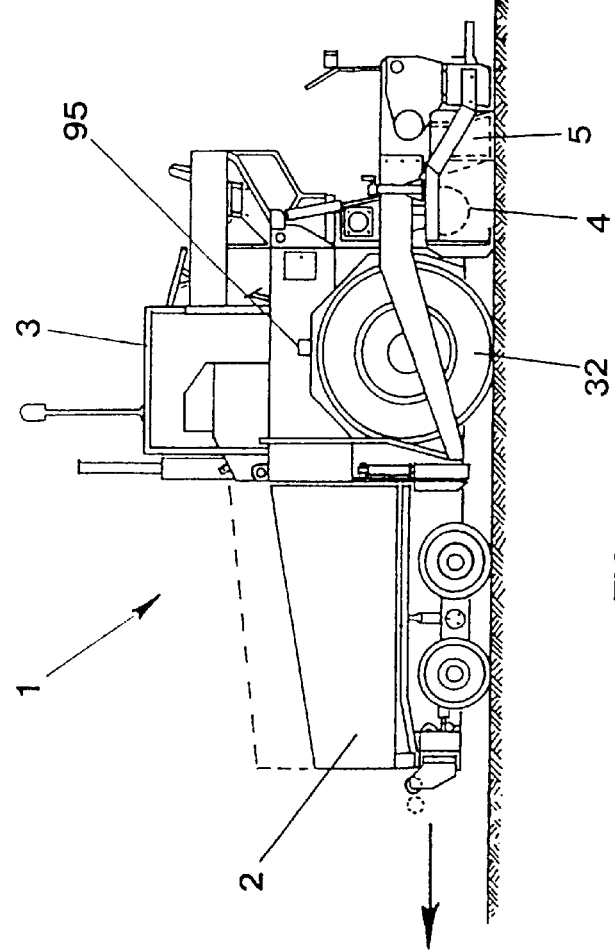
FIG. 1 is a side view the finishing machine.

Referring to the mentioned drawings, it can be observed that the finishing machine represented in FIG. 1 and indicated as a whole with 1, has a hopper 2 for the storage of the asphalt arranged in front of the cab 3 of the machine. In the rear, as shown in a schematic representation, the distribution auger 4 of the asphalt and the shearing device 5, can be observed.

Figure 2:
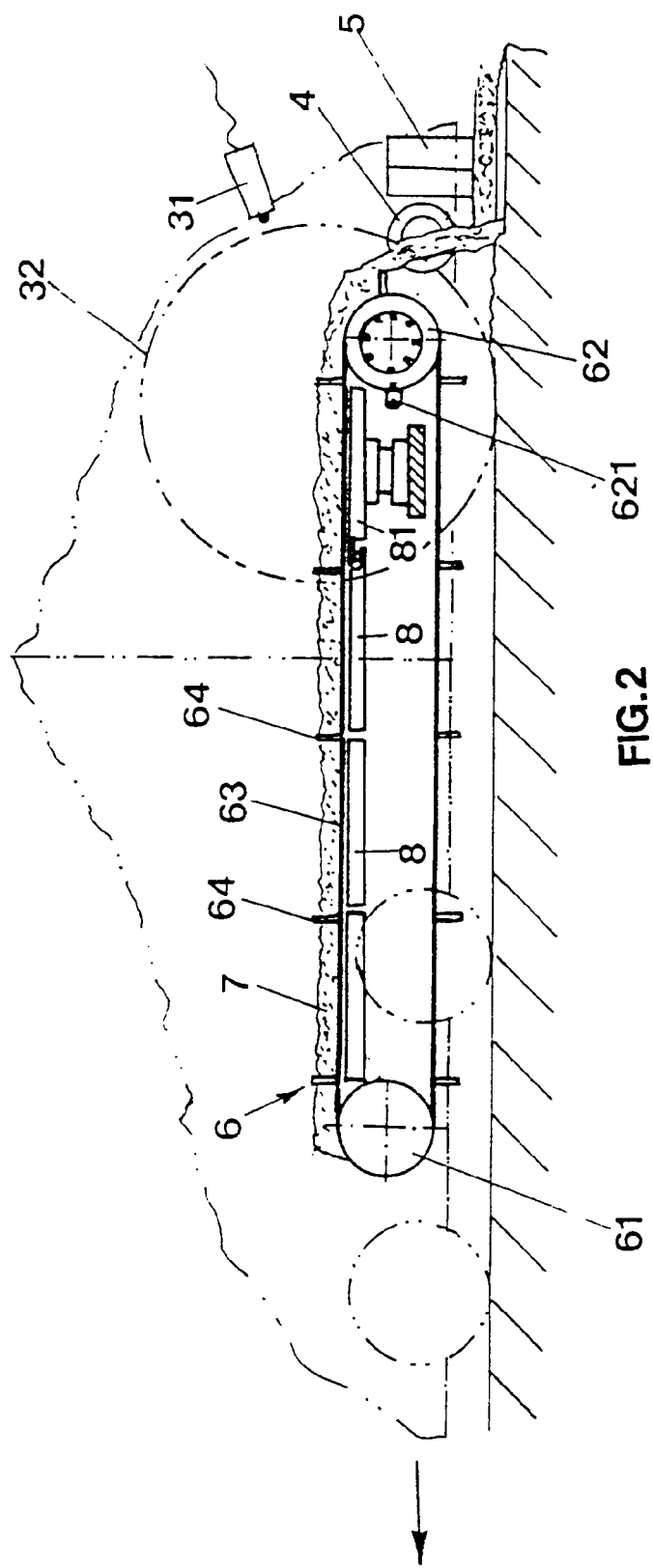
FIG. 2 is a schematic of the conveyer which connects the front hopper to the distribution augers.

On the bottom of the hopper 2, is a conveyer 6. This conveyer 6 transports the conglomerate asphalt 7 from the hopper 2 to the distribution augers 4. As FIGS. 2 and 3 show, the conveyer 6 is extended in between two pulleys 61 and 62, on which two guide chains 63 are distributed. Only one of these chains 63 can be observed in FIG. 2. In between the chains 63, a plurality of transversal splines 64 is present and they are useful for carrying away the conglomerate of asphalt 7 from the hopper 2 to the distribution auger 4. The transversal splines 7 crawl on a plurality of plates 8.

The plates 8 are fixed to the frame of the machine and provide the base on which the passing material leans when moving from the hopper to the distribution augers 4. As FIGS. 2 and 3 show, the last supporting or weighing plate 81, is not anchored to the frame of the machine but it rests on a loading cell 9. The last fixed plate 8 is hinged on the edge by the hinge 82. It is clear that when the material passes on the weighing plate 81, the weight of the material will cause the weighing plate 81 to incline towards the bottom, being hinged in 82 and loading the loading cell 9. From the loading cell 9 exits a signal 91 which is received from the control power unit 10.

A further signal 92 is received by the turns sensor 621 which controls the rotation angle of the pulley 62 and its speed. When the rotation angle of the pulley is such that the linear route of the conveyer is the same as the length of the plate 81, it is clear that all the material of the first weighing does not influence the plate after it has been unloaded and another weighing can be executed, a new material now pressing on the plate 81.

It is clear that the greater the speed of the pulley 62, the greater is the quantity of material which passes on the plate 81. Such material is distributed from the augers 4 and forms the asphalt surface under the shearing device 5.

Also, the information from the sensor 31 which controls the advancing speed of the wheel 32 of the finishing machine 1, is sent to the power unit 10. A program is used with the power unit 10 that gives the weight of the asphalt laid along a stretch of road, and relates the measured weight during a certain time to the road covered by the finishing machine.

Sensors 51 and 52 can be put near the shearing device wherein the width of the asphalt surface laid can be controlled by the shearing device. Such sensors 51 and 52 send signal 511 to the power unit 10 making it easy to obtain the information relevant to the weight of the asphalt for a surface unity of a certain stretch of road.

Similarly, the compressing of the material and the indication of the thickness of the material for every stretch of road can be given by the control power unit 10. All the information which, opportunely organized can give a certification of the thickness or the quantity of weight of the material laid by the machine along all the route, provided the length variations of the covered surface are sent to the power unit 10.

Since the machine 1 can work in conditions both on plane and inclined surfaces, for example on slopes or descents, it is clear that in such case the registered weight by the loading cell 9 is not accurate. In this case, the machine of the invention includes an inclination sensor anchored to the frame of the machine and illustrated in FIG. 1.

The inclination sensor 95 emits a signal 951 to the control power unit 10 which corrects the weighing of the loading cell with regard the correction factor resulting from the inclination of the machine and therefore to the gravitational component itself.

At last, it can be observed that because the asphalt conglomerate which passes on the conveyer is heated, it is easy for the asphalt to penetrate in between a support plate and the other one under the conveyer. Because of this, it is important that the weighing plate 81 is protected from possible infiltrations of material.

The protection of the weighing plate 81 is accomplished by the application of a gasket 83 which has a T shape and which has two wings 84 and 85. Each wing 84 and 85 is beveled in order to guarantee the perfect adherence to the plane of each plate 8 and 81. The beveled shape prevents the passing of material that could penetrate under the gasket itself. The central part 86 of the gasket is inserted between two vertical walls of the plates 8 and 81 in order to protect the hinge 82. The hinge 82 should remain free in order to guarantee that the weighing plate 81 can freely incline as the weight passes over it.

According to what has been described, an advantage of the invention is that it allows the weight of the distributed material to be determined during a specified time and in the space of the finishing machine. It has also been illustrated that the distribution of the asphalt surface for each square metre of the route covered by the finishing machine can be determined.

What is claimed is:

1. A finishing machine for carrying asphalt material and for laying asphalt surfaces on the ground therefrom comprising:

a frame;

a hopper for storage and distribution of the material secured to the frame;

a conveyer secured to the frame for conveying the material from the hopper;

a distribution auger located at an output end of the conveyer for receiving the material from the conveyor output and depositing the material on the ground;

a shearing device located adjacent the auger for compressing the deposited material against the ground, said conveyer comprising a pair of endless chains;

pulleys carrying the chains;

transversal splines connecting the chains for transporting the material from the hopper;

a plurality of fixed plates anchored to the frame between the chains for supporting the material thereon;

a weighing device secured to at least one of said plurality of plates for providing a weight signal indicative of the weight of the material thereon;

a controller being responsive to the weight signal for producing an indication of the amount of material deposited on the ground at time intervals which are a function of the angular speed of the pulleys, such that at least two successive weighings take place after all the weighed material is unloaded from the weighing device; and a width detector for sensing the width of the asphalt layer distributed by the shearing device and providing a width signal, said controller being responsive to the width signal, such that the resulting information is the weight of the asphalt distributed in an area of a predetermined stretch of road.

2. A finishing machine according to the claim 1, further comprising a speed sensor for sensing the translation speed of the finishing machine, and said controller being responsive to a speed signal, such that the resulting information is the weight of the asphalt distributed by the machine along a stretch of covered road.

3. A finishing machine according to claim 1, further comprising an inclination detector for sensing the inclination of said machine in comparison with the vertical, and producing an inclination signal, said controller being responsive to the inclination signal for correcting the weight detected when the finishing machine works on non-planar road routes.

4. A finishing machine according to the claim 1, wherein the weighing device comprises a load cell.

5. A finishing machine according to the claim 1, including a gasket located between a trailing edge of a hinged plate and a leading edge of an adjacent plate, said gasket substantially being T shaped with two wings opposed to one another and a centrally located depending part, said wings being beveled and disposed, one each, on the surface of each of said hinged plate and said adjacent plate, and the central depending part thereof inserted between the two plates.

* * * * *